United States Patent
Cann et al.

(10) Patent No.: US 10,221,263 B2
(45) Date of Patent: Mar. 5, 2019

(54) MIXED COMPATIBLE ZIEGLER-NATTA / CHROMIUM CATALYSTS FOR IMPROVED POLYMER PRODUCTS

(71) Applicant: Univation Technologies, LLC, Houston, TX (US)

(72) Inventors: Kevin J. Cann, Rocky Hill, NJ (US); Robert J. Jorgensen, Scott Depot, WV (US); Wesley R. Mariott, Manvel, TX (US); Mark G. Goode, Hurricane, WV (US); John H. Moorhouse, Kendall Park, NJ (US)

(73) Assignee: Univation Technologies, LLC, Houston, TX (US)

( * ) Notice: Subject to any disclaimer, the term of this patent is extended or adjusted under 35 U.S.C. 154(b) by 592 days.

(21) Appl. No.: 14/433,220

(22) PCT Filed: Nov. 1, 2013

(86) PCT No.: PCT/US2013/067947
§ 371 (c)(1),
(2) Date: Apr. 2, 2015

(87) PCT Pub. No.: WO2014/071119
PCT Pub. Date: May 8, 2014

(65) Prior Publication Data
US 2015/0274859 A1 Oct. 1, 2015

Related U.S. Application Data

(60) Provisional application No. 61/721,203, filed on Nov. 1, 2012.

(51) Int. Cl.
*C08F 110/14* (2006.01)
*C08F 210/16* (2006.01)
*C08F 4/646* (2006.01)
*C08F 4/69* (2006.01)

(52) U.S. Cl.
CPC .......... *C08F 110/14* (2013.01); *C08F 210/16* (2013.01); *C08F 2410/04* (2013.01)

(58) Field of Classification Search
CPC ...................................... C08F 4/00; C08F 4/44
USPC ........................................ 526/118, 119, 114
See application file for complete search history.

(56) References Cited

U.S. PATENT DOCUMENTS

| | | | | |
|---|---|---|---|---|
| 4,263,422 A | * | 4/1981 | Lowery, Jr. ............. | C08F 10/00 502/113 |
| 4,558,024 A | * | 12/1985 | Best ........................ | C08F 10/00 502/115 |
| 5,330,950 A | | 7/1994 | Hsieh | |
| 5,408,015 A | | 4/1995 | Hsieh | |
| 2006/0155082 A1 | | 7/2006 | McDaniel et al. | |
| 2006/0160965 A1 | | 7/2006 | Goode et al. | |
| 2007/0060725 A1 | * | 3/2007 | Zoeckler ................. | C08F 10/00 526/124.3 |
| 2011/0237763 A1 | * | 9/2011 | Goode .................... | C08F 10/00 526/96 |

FOREIGN PATENT DOCUMENTS

| | | | | |
|---|---|---|---|---|
| EP | 1153943 A1 | 11/2001 | | |
| WO | WO 2004050722 A1 * | 6/2004 | ............. | C08F 10/02 |
| WO | 2009108174 | 9/2009 | | |
| WO | WO 2012/019276 | 2/2012 | | |

* cited by examiner

*Primary Examiner* — Fred M Teskin
(74) *Attorney, Agent, or Firm* — Brooks, Cameron & Huebsch, PLLC (57) ABSTRACT

A catalyst system for polymerizing olefin-based polymers and interpolymers is disclosed. The catalyst system may include a supported chromium catalyst and a Ziegler-Natta catalyst comprising a bulking agent, Mg, and Ti. The Ziegler-Natta catalysts in catalyst systems disclosed herein run exceptionally well without addition of excessive amounts of co-catalyst, thus allowing for use of chromium based supported catalysts that would otherwise be overwhelmed by aluminum alkyl. Further, embodiments disclosed herein may be run without an internal electron donor, and the lack of an internal electron donor in the system also prevents poisoning of the chromium catalysts by the internal electron donor. By including or co-feeding a chromium based catalyst with these Ziegler-Natta catalysts, it has been found that the molecular architecture of the resulting polyolefins, such as polyethylenes, may provide for resins with excellent processing properties.

15 Claims, 2 Drawing Sheets

MIXED COMPATIBLE ZIEGLER-NATTA / CHROMIUM CATALYSTS FOR IMPROVED POLYMER PRODUCTS

CROSS-REFERENCE TO RELATED APPLICATIONS

This application is a National Stage application under 35 U.S.C. § 371 of International Application No. PCT/US2013/67947, filed Nov. 10, 2013, that claims the benefit of Ser. No. 61/721,203, filed Nov. 1, 2012, the disclosures of which are incorporated by reference in their entireties.

FIELD OF THE DISCLOSURE

Embodiments disclosed herein relate generally to polymerization of olefin-based polymers and interpolymers with catalyst systems including a Ziegler-Natta catalyst component and a chromium catalyst component.

BACKGROUND

Polyolefins have been used extensively in a wide variety of applications including food packaging, textiles, and resin materials for various molded articles. Different polymer properties (melt flow, molecular weight distribution, density, etc.) may be desired depending on the intended use of the polymer. For example, polyolefins having relatively low molecular weights and narrow molecular weight distributions may be suitable for articles molded by an injection molding method. On the other hand, polyolefins having relatively high molecular weights and broad molecular weight distributions may be suitable for articles molded by blow molding or inflation molding. In other applications, medium-to-high molecular weight polyethylenes are desirable. Such polyethylenes have sufficient strength for applications which require such strength (e.g., pipe applications), and simultaneously possess good processing characteristics. Similarly, polyolefins having a particular flow index or within a particular flow index range are suitable for various applications.

Resins produced with chromium-based catalysts, such as reduced silyl chromate, generally have good extrusion properties. However, the resulting strength properties are typically less than resins produced with other catalysts. Similarly, resins produced from other catalysts may exhibit good strength, but may have poor extrusion properties.

Various mixed catalyst systems have heretofore been proposed to provide a blend of desirable resin properties, such as a mixture of Ziegler-Natta type catalysts and metallocene catalysts. Unfortunately, not all catalyst systems are compatible, as noted in U.S. 2006/0160965, which describes the necessity for careful transitions between incompatible Ziegler-Natta catalysts and chromium based catalysts, and uses a transition aid to scavenge co-catalyst from the Ziegler-Natta polymerization.

U.S. Pat. No. 5,330,950 and U.S. Pat. No. 5,408,015 disclose a mixed Ziegler-Natta/chromium catalyst system including a Ziegler-Natta catalyst including titanium and aluminum on a magnesium oxide support and a chromium oxide catalyst on a silica support. To maximize compatibility, the '950 patent suggests using a weight ratio of chromium catalyst to Ziegler-Natta catalyst in the range from 3:1 to 15:1; the '015 patent discloses a broader range, 6:1 to 100:1. It should be noted that these patents teach use of chromium catalysts as the majority catalyst component to maximize compatibility. Without being bound by theory, it is presently believed that the chromium catalyst was required to be the majority catalyst component because the Ziegler-Natta catalyst required a significant amount of an aluminum alkyl co-catalyst that negatively interacted with the chromium catalyst.

It would be advantageous to have a Ziegler-Natta catalyst capable of operating well without addition of high amounts of co-catalyst, thus allowing for its use with chromium based supported catalysts that would otherwise be overwhelmed by high amounts of co-catalyst.

SUMMARY OF THE DISCLOSURE

It has been found that Ziegler-Natta catalysts, as described in more detail below, may be used along with a chromium catalyst in an olefin polymerization reactor to result in improved polymer products. The Ziegler-Natta catalysts in catalyst systems disclosed herein run exceptionally well without addition of excessive amounts of co-catalyst, thus allowing for use of chromium based supported catalysts that would otherwise be overwhelmed by aluminum alkyl. Further, embodiments disclosed herein may be run without an internal electron donor, and the lack of an internal electron donor in the system also prevents poisoning of the chromium catalysts by the internal electron donor. By including or co-feeding a chromium based catalyst with these Ziegler-Natta catalysts, it has been found that the molecular architecture of the resulting polyolefins, such as polyethylenes, may provide for resins with excellent processing properties.

In one aspect, embodiments disclosed herein relate to a catalyst system for polymerizing olefin-based polymers and interpolymers. The catalyst system may include: a Ziegler-Natta catalyst comprising a bulking agent, Mg, and Ti; and a supported chromium catalyst.

In another aspect, embodiments disclosed herein relate to a process for producing olefin-based polymers. The process may include: polymerizing at least one olefin monomer in a reactor in the presence of a mixed catalyst system to produce an olefin-based polymer. The mixed catalyst system may include: a Ziegler-Natta catalyst comprising a bulking agent, Mg, and Ti; and a supported chromium catalyst.

Other aspects and advantages will be apparent from the following description and the appended claims.

DEFINITIONS

Before the present compounds, components, compositions, and/or methods are disclosed and described, it is to be understood that unless otherwise indicated this invention is not limited to specific compounds, components, compositions, reactants, reaction conditions, ligands, structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an," and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

The present disclosure provides catalyst systems for olefin polymerization, methods of making and method of using said catalyst systems, and polymer and products made therewith. The terms "mixed catalyst system" and "mixed catalyst" may be used interchangeably herein with "catalyst system."

As used herein, the phrase "characterized by the formula" and/or "characterized by the structure" is not intended to be limiting and is used in the same way that "comprising" is commonly used.

The term "polymer" is used herein to indicate, a homopolymer, a copolymer, or a terpolymer. The term "polymer" as used herein includes interpolymers, such as, for example, those made by the copolymerization of ethylene with C3-C10 alpha olefins, or propylene with ethylene and/or C4-C10 alpha olefins. The term "interpolymer," as used herein, refers to polymers prepared by the polymerization of at least two different types of monomers. The generic term interpolymer thus includes copolymers, employed to refer to polymers prepared from two different types of monomers, and the term also includes polymers prepared from more than two different types of monomers.

The term "olefin-based polymer," as used herein, refers to a polymer that comprises at least a majority mole percent olefin, for example, ethylene, or propylene, or the like, (based on total amount of polymerized monomer), and, optionally, one or more additional comonomers. As known in the art, the polymerized form of the olefin is present in the polymer. The term "ethylene-based polymer," as used herein, refers to a polymer that comprises at least a majority mole percent ethylene (based on total amount of polymerized monomer), and, optionally, one or more additional comonomers. The term "ethylene/alpha-olefin interpolymer," as used herein, refers to an ethylene-based interpolymer that comprises at least a majority mole percent ethylene (based on total amount of polymerized monomer), an alpha-olefin, and optionally, one or more additional comonomers.

As used herein the term "silyl" refers to the —$SiZ^1Z^2Z^3$ radical, where each of $Z^1$, $Z^2$, and $Z^3$ is independently selected from the group consisting of hydride and optionally substituted alkyl, alkenyl, alkynyl, heteroatom-containing alkyl, heteroatom-containing alkenyl, heteroatom-containing alkynyl, aryl, heteroaryl, alkoxy, aryloxy, amino, silyl and combinations thereof.

DETAILED DESCRIPTION

In one aspect, embodiments disclosed herein relate to processes for producing olefin-based polymers and interpolymers with a catalyst system including a Ziegler-Natta catalyst component and a chromium catalyst component. In another aspect, embodiments disclosed herein relate to catalyst systems useful for the polymerization of olefins, such as ethylene and propylene, among other monomers and comonomers, where the catalyst system includes a Ziegler-Natta catalyst component and a chromium catalyst component.

It has been found that a Ziegler-Natta catalyst, as described in more detail below, may be used along with a supported chromium-based catalyst in an olefin polymerization reactor to result in improved polymer products. The Ziegler-Natta catalysts in catalyst systems disclosed herein run exceptionally well without addition of excessive amounts of co-catalyst, thus allowing for use of chromium-based supported catalysts that would otherwise be overwhelmed by aluminum alkyl. Further, embodiments disclosed herein may be run without an internal electron donor, and the lack of an internal electron donor in the system also prevents poisoning of the chromium catalysts by the internal electron donor. By including or co-feeding a chromium based catalyst with these Ziegler-Natta catalysts, it has been found that the molecular architecture of the resulting polyolefins, such as polyethylenes, may provide for resins with excellent processing properties.

Chromium Catalysts

Supported chromium catalysts, often referred to as Phillips-type catalysts, suitable for use in the catalyst systems described herein may include, among others, $CrO_3$, chromocene, silyl chromate, chromyl chloride ($CrO_2Cl_2$), chromium-2-ethyl-hexanoate, chromium acetylacetonate ($Cr(AcAc)_3$), and di-substituted chromates, such as $CrO_2(OR)_2$, where R is triphenylsilane or a tertiary polyalicyclic alkyl. Non-limiting examples are disclosed in U.S. Pat. Nos. 3,709,853, 3,709,954, 3,231,550, 3,242,099, 4,077,904, and 4,855,370, among others. In other embodiments, the supported chromium catalysts may include any compound of chromium that is oxidizable to $CrO_3$ under appropriate activation conditions. In other embodiments, at least a portion of the chromium in the supported, activated catalyst may be in the hexavalent state.

Other non-limiting examples of the chromium catalysts may include a diarene chromium compound, biscyclopentadienyl chromium(II), chromium(II) acetate, chromium(III) acetate, chromium(III) acetylacetonate, chromium(II) chloride, chromium(III) chloride, chromium(II) fluoride, chromium(III) fluoride, chromium hexacarbonyl, chromium(III) nitrate, chromium nitride, chromium(III) 2,4-pentanedionate, chromium(III) perchlorate, chromium(III) potassium sulfate, chromium(III) sulfate, and chromium(III) telluride, among others. In other embodiments, the chromium catalyst may include bis(cyclopentadienyl)chromium $X_n$, where each leaving group X is chemically bonded to the chromium and is selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, substituted derivatives thereof, and combinations thereof, each cyclopentadienyl group is chemically bonded to M, and n is 0 or an integer from 1 to 4.

Thus, catalysts and catalyst systems useful in embodiments herein include chromium-based catalysts, reduced chromium-based catalysts, chromium oxide-based catalysts, and reduced chromium oxide-based catalysts. It is desired that any such catalytic system perform well during high space-time yield operation (i.e., operation maximizing polymer produced per unit reactor time and reactor space), producing the greatest amount of polyethylene possible with high catalyst activity in a shorter residence time. Chromium oxide catalysts possess adequate productivity and activity, yet polyethylenes produced through their use are less than optimal for a number of applications where high molecular weight, broad molecular weight distribution, and optionally the presence of some degree of bimodality of molecular weight distribution are desired. A chromium oxide-based catalyst reduced with a reducing agent will have certain properties based on the ratio of reducing agent to chromium. The stated equivalents noted herein are always the ratio of reagent to chromium. In a preferred embodiment, a chromium oxide-based catalyst used for polyolefin, e.g., polyethylene, applications includes a silica supported chromium oxide reacted subsequently reduced with DEALE (diethylaluminum ethoxide). This type of catalyst provides a polyethylene with a broad molecular weight distribution.

In general, chromium oxide-based catalysts reduced with DEALE are used to make broad molecular weight distribution polyethylene. Thus, the DEALE/Cr ratio of the catalyst in conjunction with the polymerization operating conditions influence the product characteristics and production rate.

Information about these and other types of catalysts as well as characteristics of the polymer products formed is found in U.S. Pat. No. 6,989,344. Several methods of preparation for chromium oxide-based catalysts are disclosed in U.S. Pat. Nos. 6,989,344 and 8,101,691, which are herein incorporated by reference.

Chromium compounds may also include those disclosed in U.S. App. Publication No. 2004/0087745, and U.S. Pat. Nos. 6,518,376, 6,642,324, 6,617,403, 6,627,780, 6,326,443, and 6,649,069, among others.

Ethylene polymers having broad molecular weight distributions can be obtained, for example, by use of a chromium-based catalyst obtained by calcining a chromium compound carried on an inorganic oxide carrier in a non-reducing atmosphere to activate it such that, for example, at least a portion of the carried chromium atoms is converted to hexavalent chromium atoms ($Cr^{+6}$). This type of catalyst is commonly referred to in the art as the Phillips catalyst. The chromium compound is impregnated onto a support, such as silica, dried to a free-flowing solid, and heated in the presence of oxygen to about 400° C.-860° C., converting most or all of the chromium from the +3 to the +6 oxidation state.

Another chromium-based catalyst, useful for high density polyethylene applications, consists of silyl chromate (e.g., bis-triphenylsilyl chromate) chemisorbed on a dehydrated support, such as silica, and subsequently reduced with diethylaluminum ethoxide (DEA1E).

The resulting polyethylenes produced by each of these catalysts are different with respect to some important properties. Chromium oxide-on-silica catalysts have good productivity (g PE/g catalyst), also measured by activity (g PE/g catalyst-hr), and often are used to produce polyethylenes with relatively narrower molecular weight distributions. Reduced silyl chromate-based catalysts and reduced chromium oxide catalysts may be used to produce polyethylenes with broader molecular weight distributions including a high molecular weight shoulder on molecular weight distribution curve, but often may not have as high productivity or activity as chromium oxide-on-silica catalysts.

Ziegler-Natta Catalyst

Ziegler-Natta or Ziegler-Natta type catalysts useful in embodiments disclosed herein include transition metal compounds, or mixtures thereof, that are useful in catalyzing the polymerization of addition-polymerizable monomers, generally in combination with one or more co-catalysts or activator compounds, such as the Ziegler-Natta catalysts described in U.S. 2010/0292418, which is hereby fully incorporated by reference. The Ziegler-Natta or Ziegler-Natta type catalysts are mixtures or complexes of non-metallocene transition metal compounds and magnesium compounds, such as magnesium chloride compounds.

More specifically, the Ziegler-Natta catalysts may include magnesium dichloride or a magnesium compound that can be halogenated to magnesium dichloride, and having supported thereon a Group 4 metal or a mixture of Group 4 metals, such as one or more of titanium, hafnium, and zirconium. The titanium, halfnium and zirconium may be provided by titanium chlorides, zirconium chlorides and hafnium chlorides, combinations thereof, and/or titanium, zirconium and hafnium compounds that can be halogenated to the respective chloride.

Although impregnation in an inert support may be practiced, the Ziegler-Natta catalysts used herein may be prepared by spray drying a solution comprising magnesium compound and the Group 4 metal compounds or mixture of Group 4 metal compounds in a primary diluent, such as a diluent comprising one or more C2-C6 alcohols, and subsequently halogenating the resulting solid particles. The transition metal halides may include, for example, titanium trichloride (which may be complexed with $AlCl_3$ if desired), zirconium tetrachloride, and hafnium tetrachloride. The Ziegler-Natta catalyst (spray dried or supported) should be dry and free flowing to allow for subsequent operations.

Examples of compounds that may be halogenated to the respective chloride may include:
a. Magnesium-Magnesium Ethyl Carbonate (Mg $(C_2H_5CO_2)_2$
b. Hafnium-$Hf(OR)_4$-$xCl_x$, where x is from 0 to 2, and R is methyl, ethyl, isopropyl, isobutyl or butyl
c. Titanium-$Ti(OR)_4$-$xR^1_x$, where x is 0 to 2, R is methyl, ethyl, isopropyl, isobutyl or butyl, $R^1$ is a chelating ligand, such as 2,4 pentandione or Cl
d. Zirconium-$Zr(OR)_4$-$xCl_x$, where x is 0 to 2 and R is methyl, ethyl, isopropyl, isobutyl or butyl.

Halogenating agents may include organoaluminum halides, for example alkylaluminum sesquichlorides, such as ethylaluminum sesquichloride ($Al_2(C_2H_5)_3Cl_3$). The relative quantities of magnesium dichloride, transition metal halides, and halogenating agent employed, as well as the identity of the halogenating agent, may all affect the relative performance of the resulting catalyst composition.

In some embodiments, the Ziegler-Natta catalysts are prepared by dissolution of a magnesium compound, a titanium compound, and optionally a hafnium compound and/or a zirconium compound, in an alcoholic solvent in the presence of a filler/bulking agent, if the composition is spray dried, or a support, such as a highly porous silica gel if the catalyst is physically contained within the pores of said support. The transition metal compounds may be halides, alkoxides, mixed alkoxide/2,4 pentandionates, and mixtures of such. The only requirement is solubility in the alcoholic solvent. Titanium compounds may include $TiCl_3$ (either hydrogen or aluminum reduced) and $Ti(2,4$ pentanedionate$)_2(OR)_2$, where R can be ethyl, isopropyl, n-propyl or n-butyl. Zr and Hf compounds may include chlorides or alkoxides (for example, ethoxide, propoxide, butoxide). Magnesium compounds may include $MgCl_2$ and magnesium ethyl carbonate.

Additional optional components of the composition used to form the spray-dried catalyst precursors may include the following:
a. one or more fillers or bulking agents;
b. one or more internal electron donors; and/or
c. one or more secondary diluent compounds selected from the group consisting of siloxanes, polyalkylene glycols, $C_{1-4}$ alkyl or phenyl ether or diether derivatives of polyalkylene glycols, and crown ethers.

As noted above, internal electron donors may optionally be used as intermediates during the production of the Ziegler-Natta catalyst. However, for use in embodiments disclosed herein, the resulting Ziegler-Natta catalysts should be free of or essentially free of internal electron donors, thereby minimizing or eliminating any potential poisoning of the chromium catalysts by the internal electron donor. Thus, in embodiments disclosed herein, the catalyst system is free of or essentially free of internal electron donors in a polymerization reaction. By "essentially free," it is meant that these compounds are not deliberately added to the reactor or any reactor components, and if present, are present in the reactor at less than 5 ppm, less than 3 ppm, less than 1 ppm, or at 0 ppm.

Any solid finely dispersed material that is inert to the other components of the catalyst system and subsequent polymerization, can be employed as filler or bulking agent for the present compositions. The terms "filler" and "bulking agent" are used interchangeably herein. Desirably, the filler provides bulk and strength to the resulting solid, spray-dried particles to prevent particle disintegration upon particle formation and drying. Suitable fillers can be organic or inorganic. Examples include silica (especially fumed silica), boron nitride, titanium dioxide, zinc oxide, polystyrene, and calcium carbonate. Fumed hydrophobic, surface modified, silica may be used in some embodiments; it imparts high viscosity to the slurry and good strength to the spray-dried particles. The filler should be free of absorbed water, and is desirably surface modified as well. Surface modification, such as silane treatment, removes reactive hydroxyl or other functional groups from the filler.

In some implementations, the filler is not utilized to provide an inert support for deposition of catalyst composition. Accordingly, in these implementations the filler materials do not need to have high surface area. In some embodiments, the filler may have a surface area less than 20 m$^2$/g or less than 10 m$^2$/g in other embodiments. Suitable fillers may have an average particle size (D50) no greater than 50 microns, such as no greater than 10 microns. Sufficient filler may be used to produce a slurry suitable for spray-drying, that is, a mixture including a primary diluent that is liquid at normal atmospheric conditions but readily volatilized under reduced pressure or elevated temperature. The slurry contains such filler in an amount from 0 percent by weight to 15 percent by weight, in some embodiments, such as from 2.5 percent by weight to 10 percent by weight in other embodiments. Upon spray-drying, the resulting droplets produce discrete catalyst particles after evaporation of the primary diluent. The amount of filler present in the resulting catalyst particles may be an amount in the range from 0 to 50 percent, such as from 10 to 30 percent based on total composition weight. The spray-dried catalyst particles produced in this manner typically have an average particle size (D50) from 5 to 200 microns, such as from 10 to 30 microns.

Secondary diluent compounds are desirably employed to prepare spray-dried products exhibiting a high degree of uniformity in particle size and sphericity. The resulting spray-dried Ziegler-Natta catalyst compositions possess highly uniform composition and excellent catalyst activity, with reduced formation of fines. Additionally, certain of the secondary diluents may also act as internal electron donors when such component is desired to be included in the composition. In some embodiments, the secondary diluent compound is selected from siloxanes, polyalkylene glycols, $C_1$-$C_4$ alkyl or phenyl ether or diether derivatives of polyalkylene glycols, and crown ethers.

Polyalkylene glycols may include, for example, polyethylene glycol, containing from 2 to 5 alkyleneoxide repeat units. Siloxanes and crown ethers are particularly suitable secondary diluents as they can provide improvements in particle morphology, as well as increased activity, in comparison to polymerization reactions conducted without the presence of such siloxane or crown ether compound. Siloxanes may include hexamethyldisiloxane, hexaethyldisiloxane and hexaphenyldisiloxane. Crown ethers may include 18-crown-6-ether and 15-crown-5-ether. The secondary diluent may be present in the Ziegler-Natta catalyst composition in an amount in the range from zero to 10 percent, based on total catalyst composition weight.

Materials which can be employed as supports, if the catalyst composition is prepared in that manner, are solid, particulate, porous materials, which are inert to the other components of the catalyst system, and inert during subsequent polymerization. Suitable support materials include inorganic materials, such as oxides of silicon and/or aluminum. Usually these materials have an average particle size from less than 1 micron to about 250 microns, from about 10 microns to about 150 microns in other embodiments, and a surface area of at least 3 square meters per gram, such as at least 50 square meters per gram. Polymerization activity of the catalyst can be improved by employing a silica support having an average pore size of at least 80 Angstrom units, at least 100 Angstrom units in other embodiments. The support material should be dry, that is, free of absorbed water. Drying of the support material can be effected by heating, for example, at a temperature of at least 600° C., when silica is employed as the support. Alternatively, when silica is employed, it may be dried at a temperature of at least 200° C., and optionally treated with about one weight percent to about eight weight percent of one or more of aluminum alkyl, aluminum alkyl halide or alkyl zinc compounds. Suitable compounds have the formula $M(R_4)_z X_y$, where M is either Al or Zn; y is zero, if M is Zn; and z is 2; and if M is Al, z+y=3, and z has values from 2 and 3. R4 may be methyl, ethyl, isobutyl or n-hexyl.

Suitably the precursor composition impregnated on the support contains from about 3 percent by weight to about 50 percent by weight, such as from about 15 percent by weight to about 40 percent by weight, of the Mg/Ti/Hf/Zr catalyst component.

Spray-drying may be effected by any spray-drying method known in the art. One example of a suitable spray-drying method comprises atomizing the catalyst composition, optionally with heating, and drying the resulting droplets. Atomization is accomplished by means of any suitable atomizing device to form discrete droplets that upon drying form spherical or nearly spherical shaped particles. Atomization may be effected, for example by passing a slurry of the catalyst composition through the atomizing device together with an inert drying gas, that is, a gas that is nonreactive under the conditions employed during atomization, and aids in removal of volatile components. An atomizing nozzle or a centrifugal high speed disc can be employed to effect atomization, whereby there is created a spray or dispersion of droplets of the mixture. The volumetric flow of drying gas, if used, should considerably exceed the volumetric flow of the slurry to effect atomization of the slurry and/or evaporation of the liquid medium. Ordinarily the drying gas is heated to a temperature as high as 200° C., to facilitate atomization and drying of the slurry; however, if the volumetric flow of drying gas is maintained at a very high level, it is possible to employ lower temperatures. Atomization pressures from 1 to 200 psig (0.1 to 1.5 MPa)

are suitable. Alternatively, reduced pressure in the spray recovery section of the dryer can be employed to effect solid particle formation. Some examples of suitable spray-drying methods for use with the present catalyst composition may include those disclosed in U.S. Pat. No. 5,290,745, U.S. Pat. No. 5,652,314, U.S. Pat. No. 4,376,062, U.S. Pat. No. 4,728,705, U.S. Pat. No. 5,604,172, U.S. Pat. No. 5,306,350, U.S. Pat. No. 4,638,029, U.S. Pat. No. 5,716,558 and U.S. Patent Publication No. 2007/0060725.

By adjusting the speed of the atomizing wheel and the size of the orifices of the atomizer employed during spray-drying it is possible to obtain particles having desired average particle size, for example, from 0.1 to 200 microns. By adjusting the composition of the feed to the atomizer, the solidity of the catalyst particles (that is, internal void volume) is affected, which will also affect the final polymer bulk density. Proper control of both the atomization conditions and the feedstock composition results in catalyst precursor particles that have narrow size distributions, low span values, and produce resins with high bulk density.

The precursor composition will have the formula (as moles) $Mg_xTiHf_yZr_z$, where x is from 1 to 20, y is from 0 to 10 and z is from 0 to 10. In some embodiments, y+z is zero (Mg+Ti only). In other embodiments, y+z may be greater than 0. In some embodiments, the precursor composition includes the metals in the ranges as follows: x from 3 to 10, y from 0 to 2, and z from 0 to 2.

In some embodiments, the Ziegler-Natta catalysts may include $Mg_xTiHf_yZr_z$ where x is in the range from about 4 to 6, such as about 5, and y and z are in the range from about 0.25 to 0.75, such as about 0.5.

In other embodiments, the Ziegler-Natta catalysts may include $Mg_xTiHf_yZr_z$ where x is in the range from about 4 to 6, such as about 5, and y and z are zero.

Impregnation may be performed using the techniques disclosed in U.S. Pat. No. 5,068,489 and references therein; each incorporated herein by reference.

Once formed, the catalyst precursor (the composition containing the Mg/Ti/Hf/Zr) is halogenated, such as with an alkyl aluminum chloride ($AlR_3$-$xCl_x$, where x is from 1 to 2), or boron chlorides (i.e. $RBCl_2$ or $BCl_3$). The time, temperature and concentration of halogenation agent all can affect the ultimate catalyst responses and productivity. The resultant catalyst product after halogenation may be washed to remove reaction products or may be used directly. Various halogenation procedures are disclosed in US20100292418, for example. The resulting catalyst is then collected as a free flowing solid catalyst or dispersed in a mineral oil diluent for slurry feed. Alternatively, the halogenation steps may be completed using a light hydrocarbon diluent, such as isopentane or hexane. The slurry may then either be filtered or decanted to remove the light hydrocarbon. Optionally, the filter cake may be washed to further remove any reaction products of the halogenation reaction. Finally, the halogenated precursor composition may either be dried to free flowing solid catalyst or dispersed in a mineral oil diluent for slurry feed.

The conditions used in the halogenation step (required to activate the catalyst precursor) may also have an impact on the amount of high molecular weight fraction produced by the catalyst, the inherent polymerization activity of the catalyst at a standard set of conditions, and the final polymer particle size and polymer bulk density. Too high a concentration of halogenation agent can suppress the activity of the portion of the catalyst that gives a very high molecular weight tail, while too little results in insufficient catalytic activity. Levels of halogen to residual alkoxide functionality (this is meant to include both free alcohol remaining in the catalyst precursor particles, as well as alkoxides that may have either formed by reaction of transition metal components with the alcoholic solvent, or have been present as part of the transition metal component, and measured by dissolution of the precursor compound in an aqueous media, such that all alkoxides are converted to the precursor alcohols, and subsequent Gas Chromatographic determination) may range from 0.5 to 4 moles of Cl contained in the halogenation agent/mole of alkoxide, such as within a range of 1 to 3.

In other embodiments, Ziegler-Natta catalysts that may be used include those as made by the method described in U.S. patent application Ser. No. 61/606,601. The method may include combining one or more supports with one or more magnesium-containing compounds under reaction conditions to form a first reacted product. The first reacted product may then be combined with one or more chlorinating compounds selected from one or more aluminum alkyl chlorides, one or more chloro substituted silanes, and combinations thereof to form a second reacted product. The second reacted product may then be combined with one or more titanium-containing compounds selected from one or more titanium alkoxides, one or more titanium halides, and combinations thereof under reaction conditions to form the polymerization catalyst.

The one or more magnesium-containing compounds can be represented by the formula $R_1$—Mg—$R_2$, where $R_1$ and $R_2$ are independently selected from the group consisting of hydrocarbyl groups, and halogen atoms. Suitable hydrocarbyl groups can include, but are not limited to, alkyl groups, aryl groups, and alkoxy groups. The alkyl groups, and/or alkoxy groups can include from 1 to 12 carbon atoms, or from 1 to 10 carbon atoms, or from 1 to 8 carbon atoms, or from 1 to 6 carbon atoms, or from 1 to 4 carbon atoms. The aryl groups can include from 6 to 12 carbon atoms, or from 6 to 10 carbon atoms, or from 6 to 8 carbon atoms. Suitable halogens can include fluoride, chloride, and bromide.

Illustrative magnesium-containing compounds can include, but are not limited to, dialkylmagnesiums, dicycloalkylmagnesiums, diarylmagnesiums, alkylmagnesium halides, or any combination thereof. Illustrative dialkylmagnesiums can include, but are not limited to, diethylmagnesium, dipropylmagnesium, di-isopropylmagnesium, di-n-butylmagnesium, diisobutylmagnesium, diamylmagnesium, di-n-octylmagnesium, di-n-hexylmagnesium, di-ndecylmagnesium, di-n-dodecylmagnesium, or any combination thereof. Illustrative dicycloalkylmagnesiums can include, but are not limited to, dicyclohexylmagnesium, dicyclopentylmagnesium, or any combination thereof. Illustrative diarylmagnesiums can include, but are not limited to, dibenzylmagnesium, ditolylmagnesium, dixylylmagnesium, or any combination thereof. Illustrative magnesium alkyls that include two different alky groups can include, but are not limited to, ethyl-n-propylmagnesium, ethyl-n-butylmagnesium, amyl-nhexylmagnesium, n-butyl-s-butylmagnesium, n-butyl-n-octylmagnesium, or any combination thereof. Illustrative alkymagnesium halides can include, but are not limited to, methylmagnesium chloride, ethylmagnesium chloride, n-butylmagnesium chloride, t-butylmagnesium chloride, isopropylmagnesium chloride, methylmagnesium bromide, ethylmagnesium bromide, n-butylmagnesium bromide, or any combination thereof.

It should be noted that magnesium alkyls may contain a mixture of molecules. For example, ethylmagnesium chloride may contain a mixture of molecules other than ethylmagnesium chloride, per se. For example, if a liquid or solvent is combined with ethylmagnesium chloride, the ethylmagnesium chloride may disproportionate to form a mixture of magnesium dichloride and diethylmagnesium. Such mixtures are encompassed within the general formula $R_1MgR_2$. Accordingly, it should be understood that compositions of the formula $R_1$—Mg—$R_2$ and compositions representative thereof are intended to represent the overall empirical formula of these compositions rather than to set forth the molecular formula of these compositions.

The support and the magnesium-containing compound can be combined with one another to provide or form a first mixture or first reacted product. The support and the magnesium-containing compound can at least partially react with one another during mixing thereof. Said another way, the support and the magnesium-containing compound can be combined with one another under reaction conditions such that the support and the magnesium containing compound at least partially react with one another to form a reacted first mixture or reacted first product. For example, if the support contains one or more hydroxyl groups, the magnesium-containing compound can react with at least some of the hydroxyl groups to produce a reacted first mixture or first reacted product.

The mixture of the support and the magnesium-containing compound can be heated to a temperature ranging from a low of about 20° C., about 25° C., or about 30° C. to a high of about 60° C., about 75° C., or about 120° C., for example, with suitable ranges comprising the combination of any lower temperature and any upper temperature. If the diluent is present, the temperature of the mixture can be maintained below a boiling point of the diluent. The support and the magnesium-containing compound can be mixed, blended, stirred, or otherwise agitated for a time ranging from a low of about 15 minutes, about 30 minutes, about 1 hour, about 2 hours, or about 3 hours to a high of about 5 hours, about 10 hours, about 15 hours, about 20 hours, about 25 hours, or more. The support and the magnesium-containing compound can be combined with one another and mixed under a vacuum, e.g., 50 kPa. The support and the magnesium-containing compound can be combined with one another and mixed at atmospheric pressure. The support and the magnesium-containing compound can be combined with one another and mixed under pressure, e.g., a pressure ranging from about 102 kPa to about 500 kPa. The support and the magnesium-containing compound can be combined with one another under an inert atmosphere. Inert atmospheres can be or include, but are not limited to, nitrogen, argon, helium, or any combination thereof. In another example, the support and the magnesium-containing compound can be combined with one another in a substantially inert atmosphere. The substantially inert atmosphere can be an atmosphere that contains less than about 5 mol % oxygen, less than about 3 mol % oxygen, less than about 2 mol % oxygen, less than about 1 mol % oxygen, less than about 0.5 mol % oxygen, less than about 0.1 mol % oxygen, or less than about 0.05 mol % oxygen.

The amount of the magnesium-containing compound combined with the support can range from a low of about 0.2 mmol, about 0.5 mmol, about 1 mmol, about 1.5 mmol, or about 2 mmol to a high of about 3 mmol, about 4 mmol, about 6 mmol, about 8 mmol, or about 12 mmol per gram of the support, with suitable ranges comprising the combination of any lower amount and any upper amount. For example, the amount of the magnesium-containing compound combined with the support can range from about 0.3 mmol to about 10 mmol, about 1 mmol to about 7 mmol, about 1.5 mmol to about 5 mmol, about 1.5 mmol to about 4 mmol, or about 2 mmol to about 3 mmol of the magnesium-containing compound per gram of the support.

If the support is added to the magnesium-containing compound or the magnesium-containing compound is added to the support, the support or the magnesium-containing compound can be added all at once or over a period of time. The magnesium-containing compound can be added over a period of time ranging from a low of about 1 minute, about 5 minutes, about 10 minutes or about 15 minutes to a high of about 45 minutes, about 1 hour, about 2 hours, about 4 hours, about 6 hours or more. For example, the magnesium-containing compound can be added to the support of a time of about 15 minutes to about 45 minutes, about 20 minutes to about 1 hour, or about 30 minutes to about 1.5 hours. The support and the magnesium-containing compound can be continuously or intermittently stirred over during the time the magnesium-containing compound is added to the support.

The support and the magnesium-containing compound can be combined with one another in the presence of one or more diluents to form a solution or slurry thereof. The diluent, if present, can be any liquid medium or combination of liquid mediums suitable for forming a slurry of the support, the magnesium-containing compound, or the mixture of the support and magnesium-containing compound. Illustrative diluents can include, but are not limited to, one or more alkanes, one or more aromatic hydrocarbons, one or more cycloalkanes, or any combination thereof. Illustrative alkanes can include, but are not limited to, pentane, hexane, heptane, octane, nonane, decane, structural isomers thereof, stereoisomers thereof, enantiomers thereof, or any combination thereof. Illustrative aromatic hydrocarbons can include, but are not limited to, benzene, toluene, xylenes, o-xylene, m-xylene, p-xylene, or any combination thereof. Illustrative cycloalkanes can include, but are not limited to, cyclohexane, methylcyclohexane, or a combination thereof.

The amount of the diluent, if present, can be sufficient to produce a slurry of the support and the magnesium-containing compound. The amount of diluent can range from a low of about 0.5 g, about 1 g, about 2 g, or about 2.5 g to a high of about 5 g, about 7 g, about 10 g, or about 25 g per gram of the support, with suitable ranges comprising the combination of any lower amount and any upper amount. For example, the amount of diluent, if present, can range from about 1.5 g to about 25 g, about 2 g to about 20 g, about 1 g to about 15 g, about 2.5 g to about 6 g, about 0.5 g to about 8 g, or about 2.5 g to about 5.5 g per gram of the support.

The support and the magnesium-containing compound can be combined with one another in any suitable container or vessel. The container can be an open container or a container capable of being closed or sealed. The container can include one or more devices, systems, or combination thereof capable of mixing, blending, or otherwise agitating the mixture of the support and the magnesium-containing compound. For example, the container can include one or more mixing devices such as one or more mechanical/power mixers and/or acoustic mixers such as sonic mixers. The container can include one or more heating jackets, heating coils, internal heating elements, cooling jacks, cooling coils, internal cooling elements, or the like, capable of controlling or adjusting a temperature therein.

After the support and magnesium-containing compound have been mixed and/or at least partially reacted with one another for a desired amount of time, one or more chlorinating compounds can be combined with the first mixture or the first reacted product to produce or form a second mixture or second reacted product. Illustrative chlorinating compounds can be or include, but are not limited to, aluminum alkyl chlorides, halo substituted silanes containing one or more chlorine atoms, fluorine atoms, bromine atoms, or any combination thereof, organic chlorides, or any combination thereof. Illustrative aluminum alkyl chlorides can include, but are not limited to, diethylaluminum chloride, diisobutylaluminum chloride, ethylaluminum dichloride, ethylaluminum sesquichloride, isobutylaluminum dichloride, diethylaluminum bromide, or any combination thereof. Illustrative halo substituted silanes can include, but are not limited to, dimethyldichlorosilane, chlorotrimethylsilane, methyltrichlorosilane, diethyldichlorosilane, t-butyldimethylesilyl chloride, n-butyltrichlorosilane, triethoxysilylchloride, trimethoxysilylchloride, tetrachlorosilane, tetrabromosilane, dimethyldibromosilane, trimethylbromosilane, or any combination thereof. Illustrative organic chlorides can include, but are not limited to t-butyl chloride, tetrachloromethane, chloroform, methyl chloride, tribromomethane, tetrabromomethane, or any combination thereof. In one or more embodiments, the one or more chlorinating compounds can be limited to either one or more aluminum alkyl chlorides or one or more halo substituted silanes. In one or more embodiments, the one or more chlorinating compounds can include at least one aluminum alkyl chloride and at least one halo substituted silane.

The chlorinating compound and the first reacted product can at least partially react with one another to produce a second reacted product. Said another way, the mixture of the first reacted product and the chlorinating compound can be combined with one another under reaction conditions such that the first reacted product and the chlorinating compound at least partially react with one another to form a reacted second mixture or reacted second product. For example, the chlorinating compound can react with the magnesium containing compound in the first reacted product to produce the reacted second mixture or second reacted product.

The chlorinating compound can be added to the first reacted product or conversely the first reacted product can be added to the chlorinating compound. The chlorinating compound can be combined directly with the first reacted product or the chlorinating compound can be in the form of a solution or slurry. For example, the chlorinating compound can be combined with one or more diluents to form a solution or slurry thereof. The solution or slurry of the chlorinating compound can be combined with the first reacted product to produce the second mixture or second reacted product. Suitable diluents can include, but are not limited to, the one or more alkanes, the one or more aromatic hydrocarbons, the one or more cycloalkanes, or any combination thereof, discussed and described above.

The chlorinating compound and the first reacted product can be combined with one another in any suitable container or vessel. For example, the chlorinating compound can be combined with the first reacted product within the same vessel the first reacted product was produced in. The chlorinating compound and the first reacted product can be simultaneously combined with one another in the container or vessel. If the chlorinating compound is added to the first reacted product or the first reacted product is added to the chlorinating compound, the chlorinating compound or the first reacted product can be added all at once or over a period of time. For example, the chlorinating compound can be added to the first reacted product all at one time. In another example, the chlorinating compound can be added to the first reacted product over a period of time ranging from a low of about 1 minute, about 5 minutes, about 10 minutes, or about 15 minutes to a high of about 45 minutes, about 1 hour, about 2 hours, about 4 hours, about 6 hours, or more. In another example, the chlorinating compound can be added to the first reacted product over a period of time of about 15 minutes to about 45 minutes, about 20 minutes to about 1 hour, or about 30 minutes to about 1.5 hours. The chlorinating compound and the first reacted product can be continuously or intermittently stirred during the time the chlorinating compound is added to the first reacted product.

The amount of the chlorinating compound combined with the first reacted product can range from a low of about 0.2 mmol, about 0.5 mmol, about 1 mmol, about 1.5 mmol, or about 2 mmol to a high of about 5 mmol, about 7 mmol, about 10 mmol, about 15 mmol, or about 20 mmol per gram of the support, with suitable ranges comprising the combination of any lower amount and any upper amount. For example, the second reacted product can contain about 0.25 mmol to about 20 mmol, about 1 mmol to about 10 mmol, about 1.5 mmol to about 7 mmol, or about 2 mmol to about 5 mmol of the chlorinating compound per gram of the support.

The mixture of the first reacted product and the chlorinating compound can be heated to a temperature ranging from a low of about 20° C., about 25° C., or about 30° C. to a high of about 60° C., about 75° C., or about 120° C., for example, with suitable ranges comprising the combination of any lower temperature and any upper temperature. If the diluent is present, the temperature of the second mixture can be maintained below a boiling point of the diluent. The chlorinating compound and the first reacted product can be mixed, blended, stirred, or otherwise agitated for a time ranging from a low of about 15 minutes, about 30 minutes, about 1 hour, about 2 hours, or about 3 hours to a high of about 5 hours, about 10 hours, about 15 hours, about 20 hours, about 25 hours, or more. The chlorinating compound and the first reacted product can be combined with one another and mixed under a vacuum, e.g., 50 kPa. The chlorinating compound and the first reacted product can be combined with one another and mixed at atmospheric pressure. The chlorinating compound and the first reacted product can be combined with one another and mixed under pressure, e.g., a pressure ranging from about 102 kPa to about 500 kPa. The support and the first reacted product and the chlorinating compound can be combined with one another under an inert atmosphere.

After the chlorinating compound and the first reacted product have been mixed and/or reacted with one another for a desired amount of time, one or more titanium-containing compounds can be combined with the second mixture or second reacted product to produce or form the catalyst. The titanium-containing compound and the second reacted product can at least partially react with one another during mixing thereof. Said another way, the second reacted product can be combined with the one or more titanium-containing compounds under reaction conditions to produce or form the catalyst. For example, the titanium-containing compound can react with the second reacted product to produce a reacted third mixture or catalyst. The catalyst can include the reaction product between the titanium-containing compound and the second reacted product.

Illustrative titanium-containing compounds can include, but are not limited to, one or more titanium halides, one or more titanium alkoxides, one or more titanium amides, or any combination thereof. Illustrative titanium halides can include, but are not limited to, titanium (IV) chloride, titanium (IV) bromide, titanium (IV) fluoride, titanium (IV) iodide, or any combination thereof. Illustrative titanium alkoxides can include, but are not limited to, tetraisopropyltitanate, titanium (IV) ethoxide, titanium (IV) n-butoxide, titanium (IV) t-butoxide, or any combination thereof. Illustrative titanium amides can include, but are not limited to, tetrakis(dimethylamine)titanium(IV).

The one or more titanium-containing compounds can be added to the second reacted product or conversely the second reacted product can be added to the transition metal compounds. The titanium-containing compound can be combined directly with the second reacted product or the titanium-containing compound can be in the form of a solution or slurry. For example, the titanium-containing compound can be combined with one or more diluents to form a solution or slurry thereof. The solution or slurry of the titanium-containing compound can be combined with the second reacted product to produce the catalyst. Suitable diluents can include, but are not limited to, the one or more alkanes, the one or more aromatic hydrocarbons, the one or more cycloalkanes, or any combination thereof, discussed and described above.

The titanium-containing compound and the second reacted product can be combined with one another in any suitable container or vessel. For example, the titanium-containing compound can be combined with the second reacted product within the same vessel the second reacted product was produced in. The titanium-containing compound and the second reacted product can be simultaneously combined with one another in the container or vessel. If the titanium-containing compound is added to the second reacted product or the second reacted product is added to the titanium-containing compound, the titanium-containing compound or the second reacted product can be added all at once or over a period of time. For example, the titanium-containing compound can be added to the second reacted product all at one time. In another example, the titanium-containing compound can be added to the second reacted product over a period of time ranging from a low of about 1 minute, about 5 minutes, about 10 minutes or about 15 minutes to a high of about 45 minutes, about 1 hour, about 2 hours, about 4 hours, about 6 hours or more. In another example, the titanium-containing compound can be added to the second reacted product over a time period of about 15 minutes to about 45 minutes, about 20 minutes to about 1 hour, or about 30 minutes to about 1.5 hours. The titanium-containing compound and the second reacted product can be continuously or intermittently stirred during the time the titanium-containing compound is added to the second reacted product.

The amount of the titanium-containing compound in the catalyst can range from a low of about 0.05 mmol, about 0.1 mmol, about 0.5 mmol, about 1 mmol, or about 2 mmol to a high of about 3 mmol, about 4 mmol, about 6 mmol, about 8 mmol, or about 12 mmol per gram of the support, with suitable ranges comprising the combination of any lower amount and any upper amount. For example, the catalyst can contain about 0.1 mmol to about 8 mmol, about 0.5 mmol to about 6 mmol, about 1 mmol to about 4 mmol, or about 2 mmol to about 3 mmol of the titanium-containing compound per gram of the support.

The mixture of the titanium-containing compound and second reacted product can be heated to a temperature ranging from a low of about 20° C., about 25° C., or about 30° C. to a high of about 60° C., about 75° C., or about 120° C., for example, with suitable ranges comprising the combination of any lower temperature and any upper temperature. If the diluent is present, the temperature of the second mixture can be maintained below a boiling point of the diluent. The titanium-containing compound and the second reacted product can be mixed, blended, stirred, or otherwise agitated for a time ranging from a low of about 15 minutes, about 30 minutes, about 1 hour, about 2 hours, or about 3 hours to a high of about 5 hours, about 10 hours, about 15 hours, about 20 hours, about 25 hours, or more. The titanium-containing compound and the second reacted product can be combined with one another and mixed under a vacuum, e.g., 50 kPa. The titanium-containing compound and the second reacted product can be combined with one another and mixed at atmospheric pressure. The titanium-containing compound and the second reacted product can be combined with one another and mixed under pressure, e.g., a pressure ranging from about 102 kPa to about 500 kPa. The second reacted product and the titanium-containing compound can be combined with one another in air or under an inter atmosphere. Inert atmospheres can be or include, but are not limited to, nitrogen, argon, or a combination thereof.

If a diluent is used in preparation of the catalyst, e.g., in the preparation of the first reacted product, the second reacted product, and/or the mixture of the titanium-containing compound and the second reacted product, at least a portion of the diluent can be removed. The diluent can be removed using any suitable process. For example, the diluent can be removed from the catalyst by placing the slurried catalyst under a vacuum, heating the slurry to a temperature sufficient to vaporize the diluent, or a combination thereof to produce a dried, free-flowing catalyst. As such, the catalyst can be in the form of a slurry, i.e., the diluent was used in producing the catalyst, or the catalyst can be in the form of a powder, i.e., either no diluent was used or, if the diluent was present a sufficient amount of the diluent was removed therefrom to produce the powdered catalyst. In one or more embodiments, the catalyst can have a crystalline phase or structure, an amorphous phase or structure, or a mixture of crystalline and amorphous phases.

In one or more embodiments, if the catalyst includes one or more aluminum alkyl chlorides as the chlorinating compound, the titanium-containing compound can include the one or more titanium alkoxides, the one or more titanium amides, or the combination thereof. In one or more embodiments, if the catalyst includes one or more substituted silanes as the chlorinating compound, the titanium-containing compound can include one or more titanium halides. Said another way, when the titanium-containing compound is a titanium halide, the chlorinating compound can be one or more substituted silanes. Likewise, when the titanium-containing compound is a titanium alkoxide and/or a titanium amide, the chlorinating compound can be one or more aluminum alkyl chlorides. In at least one specific embodiment, when the chlorinating compound includes one or more aluminum alkyl chlorides, the chlorinating compound can be free of or essentially free of any intentionally added substituted silanes. In at least one other specific embodiment, when the chlorinating compound includes one or more substituted silanes, the chlorinating compound can be free of or essentially free of any intentionally added aluminum alkyl chlorides.

Co-catalysts may be used along with the Ziegler-Natta catalysts described herein. Co-catalysts are those typical of Ziegler-Natta Catalysts, for example, trialkyl aluminum compounds and dialkylaluminum halides. Co-catalysts include trimethylaluminum, triethylaluminum, tri-n-hexyl-aluminum and tri-iso-butylaluminum in various embodiments. The Ziegler-Natta catalysts described herein are active at low added co-catalyst levels, with excellent polymerization activity occurring with added (via co-catalyst feed) Al/Ti mole ratios in the reactor of less than 35:1, and as low as 20:1 or 15:1, although higher or lower amounts may be used. When used in multiple reactor systems, the catalysts may retain full polymerization activity in the subsequent reactor(s), even in the absence of additional co-catalyst feed.
Catalyst Mixtures Due to the nature of the Ziegler-Natta catalysts described above, having good activity at low co-catalyst ratios and lack of an internal electron donor, it is possible to use such Ziegler-Natta catalysts in conjunction with chromium-based catalysts in an olefin polymerization reactor without detriment. The Ziegler-Natta catalyst and the chromium catalyst may be fed to a polymerization reactor independently, or may be co-fed to a polymerization reactor for contact of the mixed catalyst system with an olefin.

The relative amounts of the Ziegler-Natta catalyst and the chromium catalyst used in the reactor may depend upon the desired properties of the resulting polymer and the relative activities of the Ziegler-Natta catalyst and the chromium catalyst, which may be the same or different, among other factors.

In some embodiments, the mixed catalyst system may have a weight ratio of the supported chromium catalyst to the Ziegler-Natta catalyst in the range from about 1:99 to 99:1 or from about 5:95 to 95:5 in other embodiments. In various embodiments, the mixed catalyst system may have a weight ratio of the supported chromium catalyst to the Ziegler-Natta catalyst in the range from about 1:99 to 2.5:1, 1:99 to 2:1, 1:25 to 2.5:1, 1:25 to 2:1, 1:15 to 2.5:1, 1:15 to 2:1, 1:25 to 1:1, 1:99 to 5.5:1, 1:99 to 5:1, 1:25 to 5.5:1, 1:25 to 5:1, 1:15 to 5.5:1, or 1:15 to 5:1.

As noted above, the Ziegler-Natta catalysts are active at low co-catalyst ratios, sufficient for use in admixture with a chromium catalyst, even where the chromium catalyst is a minority component. The low aluminum alkyl requirement and the resulting compatibility of the Ziegler-Natta and chromium catalysts allows for use of a chromium catalyst without fear of the chromium catalyst being overwhelmed by aluminum alkyl in the polymerization reactor. The catalyst systems disclosed herein, when including an aluminum alkyl co-catalyst, may use the aluminum alkyl in an amount such that a molar ratio of aluminum alkyl to Cr in the polymerization reactor is less than about 300:1, 200:1, 100:1, 50:1, 40:1, 30:1, 20:1, 10:1, or 5:1.

The resulting polymer or interpolymer recovered from the polymerization reactor(s) may thus include polymer produced by both catalysts. In some embodiments, such as for extrusion grade polyolefins, it may be desirable to use the respective catalysts at a ratio sufficient to result in at least 5 wt % polymer being produced by the chromium catalyst. The chromium catalyst, such as a reduced silyl chromate catalyst or reduced chromium oxide catalysts, may provide a high molecular weight tail, providing for excellent extrudability and bubble stability of the resulting resins. Other grades of polymer may appropriately use other ratios of catalyst and polymer produced.

Polymerization Process

Embodiments for producing polyolefin polymers disclosed herein may employ any suitable process for the polymerization of olefins, including any liquid phase, suspension, solution, slurry, or gas phase process, including condensed-mode gas phase processes, using known equipment and reaction conditions, and are not limited to any specific type of polymerization system. Generally, olefin polymerization temperatures may range from about 0° C. to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40° C. to about 300° C.

The catalyst systems disclosed herein may be especially useful with gas phase polymerization systems, which may be operated at sub or superatmospheric pressures in the range from 0.07 to 68.9 bar (1 to 1000 psig), such as from 3.45 to 27.6 bar (50 to 400 psig) in some embodiments, from 6.89 to 24.1 bar (100 to 350 psig) in other embodiments, and temperatures in the range from 30 to 130° C., or from 65 to 110° C., from 75 to 120° C. in other embodiments, or from 80 to 120° C. in other embodiments. In some embodiments, operating temperatures may be less than 112° C., or between 90° C. and 112° C. Stirred or fluidized bed gas phase polymerization systems may be of use in embodiments of this disclosure.

Embodiments for producing polyolefin polymers disclosed herein may also employ a gas phase polymerization process utilizing a fluidized bed reactor. This type reactor, and means for operating the reactor, are well known and completely described in, for example, U.S. Pat. Nos. 3,709, 853; 4,003,712; 4,011,382; 4,302,566; 4,543,399; 4,882, 400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent. As described above, the method and manner for measuring and controlling static charge levels may depend upon the type of reactor system employed.

Other gas phase processes contemplated by the processes herein include series or multistage polymerization processes, as well as those described in U.S. Pat. Nos. 5,627, 242, 5,665,818 and 5,677,375, and European publications EP-A-0 794 200 EP-B1-0 649 992, EP-A-0 802 202 and EP-B-634 421 all of which are herein fully incorporated by reference.

In general, the polymerization process may be a continuous gas phase process, such as a fluid bed process. A fluid bed reactor for use in embodiments herein typically has a reaction zone and a so-called velocity reduction zone (disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

Further, it is common to use a staged reactor system employing two or more reactors in series, where one reactor may produce, for example, a high molecular weight component and another reactor may produce a low molecular weight component. Embodiments herein include production of a polyolefin using a staged gas phase reactor. Such commercial polymerization systems are described in, for example, U.S. Pat. No. 5,665,818, U.S. Pat. No. 5,677,375, and EP-A-0 794 200.

In one embodiment, the one or more reactors in a gas phase or fluidized bed polymerization process may be operated at a pressure in the range from about 0.7 to about 70 bar (about 10 to 1000 psia); and in another embodiment a pressure in the range from about 14 to about 42 bar (about 200 to about 600 psia). The one or more reactors may be operated at a temperature in the range from about 10° C. to about 150° C.; and in another embodiment from about 40° C. to about 125° C. In some embodiments, the reactor temperature may be operated at the highest feasible temperature taking into account the sintering temperature of the polymer within the reactor. The superficial gas velocity in the one or more reactors may range from about 0.2 to 1.1 meters/second (0.7 to 3.5 feet/second).

In one embodiment, the polymerization process is a continuous gas phase process that includes the steps of: (a) introducing a recycle stream (including ethylene and alpha olefin monomers) into the reactor; (b) introducing the catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

The polymerization processes of embodiments herein is not limited to any specific type of fluidized or gas phase polymerization reaction and can be carried out in a single reactor or multiple reactors such as two or more reactors in series. In embodiments, the polymerization may be carried out in fluidized bed polymerizations (that may be mechanically stirred and/or gas fluidized), or with those utilizing a gas phase, similar to that as described above. In addition to well-known conventional gas phase polymerization processes, "condensing mode," "induced condensing mode" and "liquid monomer" operation of a gas phase polymerization may be used. For example, embodiments may employ a condensing mode polymerization, such as those disclosed in U.S. Pat. Nos. 4,543,399; 4,588,790; 4,994,534; 5,352,749; 5,462,999; and 6,489,408, each of which is hereby incorporated by reference. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304, which is hereby incorporated by reference.

Other embodiments may also use a liquid monomer polymerization mode such as those disclosed in U.S. Pat. No. 5,453,471; U.S. Ser. No. 08/510,375; PCT 95/09826 (US) and PCT 95/09827 (US). When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 m$^2$/g. Silica has a primary particle size of about 5 to about 50 nanometers, an average size of aggregate of about 0.1 to about 30 microns, and a specific surface area from about 50 to about 500 m$^2$/g. Clay, talc, and polymeric materials have an average particle size of about 0.01 to about 10 microns and a specific surface area of about 3 to 30 m$^2$/g. These inert particulate materials may be used in amounts ranging from about 0.3 to about 80% in some embodiments, and from about 5 to about 50% in other embodiments, based on the weight of the final product. They are especially useful for the polymerization of sticky polymers as disclosed in U.S. Pat. Nos. 4,994,534 and 5,304,588.

Polymerization processes disclosed herein are suitable for the production of homopolymers of olefins, including ethylene and propylene, and/or interpolymers (copolymers, terpolymers, and the like), of olefins, including polymers comprising ethylene and at least one or more other olefins. The olefins may be alpha-olefins. The olefins, for example, may contain from 2 to 16 carbon atoms in one embodiment; ethylene and a comonomer comprising from 3 to 12 carbon atoms in another embodiment; ethylene and a comonomer comprising from 4 to 10 carbon atoms in another embodiment; and ethylene and a comonomer comprising from 4 to 8 carbon atoms in another embodiment.

In embodiments, the interpolymers of ethylene and at least one alpha-olefin may have an ethylene content of at least about 50% by weight of the total monomers involved. Olefins that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

Other monomers useful in the process described herein include ethylenically unsaturated monomers, diolefins having 4 to 18 carbon atoms, conjugated or non-conjugated dienes, polyenes, vinyl monomers and cyclic olefins. Non-limiting monomers useful in embodiments herein may include norbornene, norbornadiene, isobutylene, isoprene, vinylbenzocyclobutane, styrenes, alkyl substituted styrene, ethylidene norbornene, dicyclopentadiene and cyclopentene. In another embodiment of the process described herein, ethylene or propylene may be polymerized with at least two different comonomers, optionally one of which may be a diene, to form a terpolymer.

In some embodiments, the content of the alpha-olefin incorporated into the copolymer may be no greater than 30 mol % in total; from 2 to 20 mol % in other embodiments. The term "polyethylene" when used herein is used generically to refer to any or all of the polymers comprising ethylene described above.

In a family of embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1, 1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into a propylene-based polymer may be no greater than 49 mol % in total; from 3 to 35 mol % in other embodiments.

Hydrogen gas is often used in olefin polymerization to control the final properties of the polyolefin. Using the mixed catalyst system disclosed herein, increasing the concentration (partial pressure) of hydrogen may increase the melt flow index (MFI) and/or melt index (MI) of the polyolefin generated. The MFI or MI may thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes is typically an amount necessary to achieve the desired MFI or MI of the final polyolefin resin.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art.

The polymers produced by the processes described herein can be used in a wide variety of products and end-use applications. Ethylene-based polymers that may be produced according to embodiments herein may include linear low density polyethylene, elastomers, plastomers, high density polyethylenes, medium density polyethylenes, and low density polyethylenes, where the ethylene-based polymers may have a density in the range of from 0.86 g/cc to 0.97 g/cc, measured in accordance with ASTM-D-1238. Propylene based polymers that may be produced according to embodiments disclosed herein include polypropylene homopolymers and polypropylene copolymers, including random copolymers and impact copolymers, such as atactic polypropylene, isotactic polypropylene, hemi-isotactic and syndiotactic polypropylene. Other propylene polymers include propylene block, random, or impact copolymers. Propylene polymers of these types are well known in the art, as disclosed in, for example, U.S. Pat. Nos. 4,794,096, 3,248,455, 4,376,851, 5,036,034 and 5,459,117, all of which are herein incorporated by reference.

In a class of embodiments, the polymers of the disclosure may comprise a unimodal, bimodal or multimodal molecular weight distribution (MWD). A bimodal polymer/resin is defined herein as a polymer/resin comprising two peaks in it's molecular weight distribution, one of the two peaks having a higher average molecular weight (defined herein as the high molecular weight component) than the other component (defined as the low molecular weight component). A multimodal polymer/resin is defined as a polymer/resin comprising more than two peaks in the molecular weight distribution.

The polymers produced using catalyst systems disclosed herein may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes, and the like.

Polymers produced by the processes disclosed herein and blends thereof are useful in such forming operations as film, sheet, and fiber extrusion and co-extrusion as well as blow molding, injection molding and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

Experiments were performed with independent catalysts (only a Ziegler-Natta or a chromium catalyst fed to a slurry polymerization reactor) and combinations of catalysts (mixture of Ziegler-Natta and chromium catalyst fed to a slurry polymerization reactor). In a typical slurry polymerization, catalyst was charged to a reactor equipped with a mechanical stirrer and a jacket for internal temperature control. Catalyst was introduced followed by 600 mL of dry purified isobutane. 1500 cc of hydrogen was batch charged, the reactor was brought up to reaction temperature (95° C. in these examples), during which step ethylene feed was started, and 10 mL of 1-hexene and 0.31 mmol of TEAL was batch charged through a bomb. The ethylene was fed continuously upon demand to maintain an ethylene partial pressure of 13.8 bar (200 psi). Ethylene uptake was measured with an electronic flow meter. The reactor was opened after depressurization and cooled in order to recover the polymer. After drying, polymer flow index and other properties were measured as described below.

Ziegler Natta Catalyst (ZN-1)

The Ziegler-Natta catalyst used in these experiments was prepared according to the following procedure. About 613 g of Davison 955 silica, purchased from W. R. Grace & Co., that had been previously calcined at 600° C. was charged to a 6 liter mix tank under an inert nitrogen atmosphere. About 2.3 kg of dry, degassed hexane was added to the mix tank and the slurry was heated to a temperature of about 60° C. with mixing. About 865 g of a 1.2 M n-butylethylmagnessium (BEM) solution in heptane (19.6 wt % BEM) was added to the silica/hexane slurry over the course of about 1 hour and was mixed for an additional hour at 60° C. to produce a first reacted product. About 198 g of dimethyldichlorosilane (DMDCS) was added to the first reacted product over the course of about 1 hour and was mixed for an additional hour at 60° C. to produce a second reacted product. About 290 g of titanium (IV) chloride was diluted with about 100 g of hexane before being added to the second reacted product over the course of about 1 hour and was held at a temperature of about 60° C. and further mixed for about 1 hour and then the volatiles were removed therefrom under reduced pressure to produce the catalyst. The catalyst was in the form of a free-flowing powder.

Chromium-Based Catalyst (CR-1)

One chromium based catalyst used in these experiments is a reduced silyl-chromate catalyst prepared as described in U.S. Patent Application Publication No. 2011/0010938, Examples 1-10.

Chromium-Based Catalyst (CR-2)

A second chromium based catalysts used in these experiments is similar to the catalysts as described in U.S. Pat. No. 8,101,691, Examples 4 and 5.

Polymerization Reactions

A one liter stirred reactor was used for the polymerization reactions. The reactor was thoroughly dried under a purge of nitrogen at elevated temperatures before each run. 500 mL of dry isobutane was fed to the reactor at 40° C. Unless otherwise noted, 10 mL of 1-hexene was used in each experiment. The reactor was sealed and hydrogen was charged. The reactor was then charged to 470 total psi with ethylene. The co-catalyst used was triethylaluminum (TEAL). The reactor was opened after depressurization, and the temperature lowered. The polymer weight was determined after allowing the diluent to evaporate. The polymer was then characterized in a number of tests.

The experimental conditions and results are shown in the tables below.

| Ex. # | Catalyst | Weight of Catalyst (g) | Amount of Co-Catalyst (mmol) | Reaction Time (min) | Yield (g) |
|---|---|---|---|---|---|
| 1 | CR-1 | 0.352 | 0.31 | 60 | 100 |
| 2 | CR-2 | 0.211 | 0.31 | 60 | 91 |
| 3 | ZN-1 | 0.013 | 0.31 | 58 | 106 |
| 4 | 0.015 g ZN-1 + 0.18 g CR-2 | 0.195 | 0.31 | 81 | 211 |
| 5 | 0.015 g ZN-1 + 0.30 g CR-1 | 0.311 | 0.31 | 53 | 78 |

| Ex. # | MI2 | Flow Index | I2 MFR | Activity (gPE/g cat-h) | Bulk Density (g/cc) | $M_n$ (×10³) | $M_w$ (×10³) | $M_z$ (×10⁶) | $M_w/M_n$ |
|---|---|---|---|---|---|---|---|---|---|
| 1 | 0.54 | 64.1 | 119 | 286 | 0.25 | 7.4 | 169 | 1.48 | 22.9 |
| 2 | 0.09 | 17.4 | 187 | 432 | 0.25 | 9.2 | 313 | 1.99 | 34.0 |
| 3 | 0.37 | 14.3 | 39 | 8695 | 0.35 | 22.6 | 190 | 0.87 | 8.4 |
| 4 | 0.24 | 12.8 | 55 | 801 | 0.37 | 14.6 | 259 | 1.57 | 17.7 |
| 5 | 0.26 | 21.0 | 80 | 286 | 0.32 | 16.6 | 221 | 1.06 | 13.3 |

Figure 1:
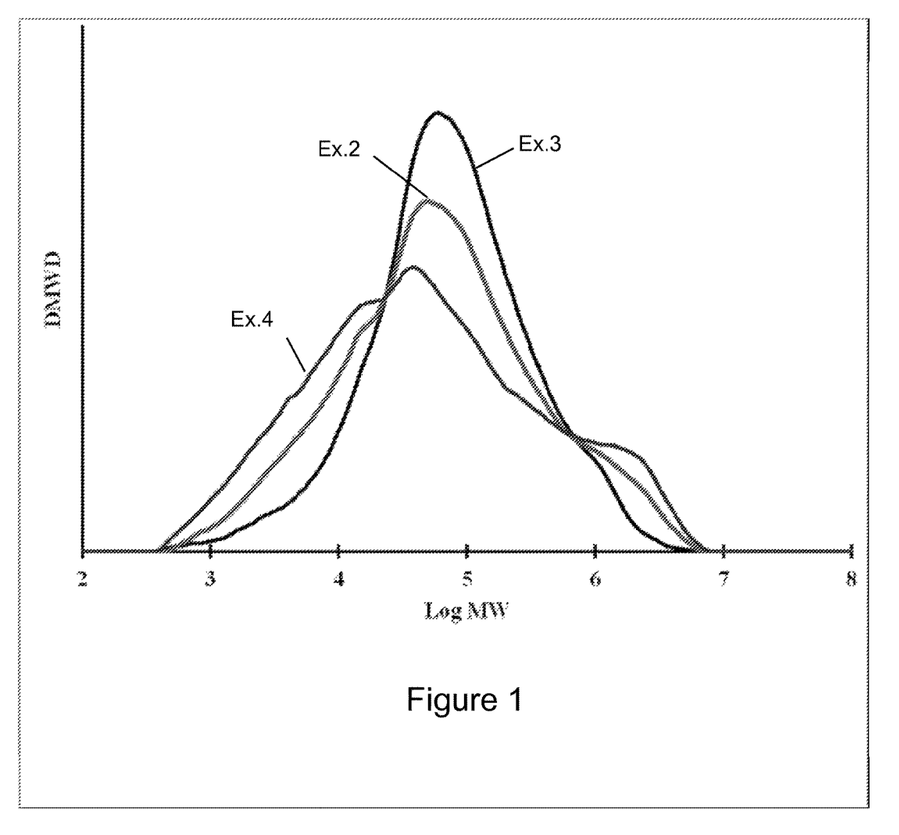
FIG. 1 illustrates molecular weight distributions of polymers produced with various catalyst systems described herein.
Figure 2:
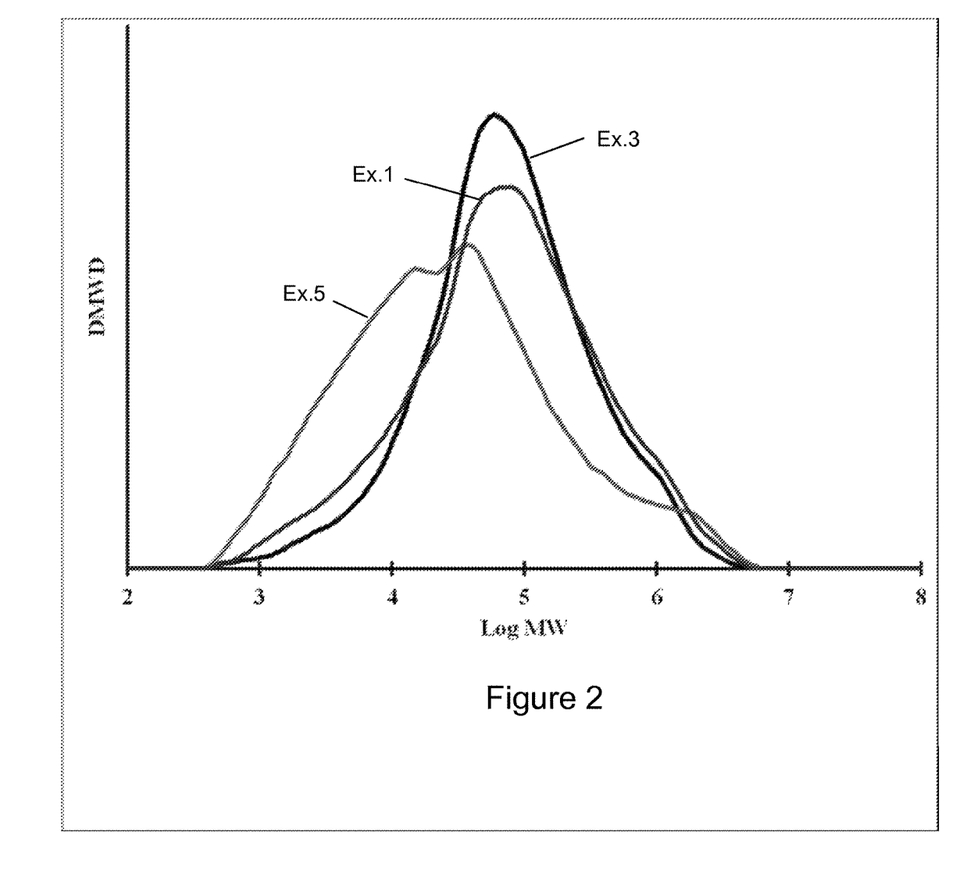
FIG. 2 illustrates molecular weight distributions of polymers produced with various catalyst systems described herein.

FIGS. 1 and 2 show size exclusion chromatography (SEC) results for the polymers produced in Examples 1-5. As shown, the experiments including a mixtures of catalysts (Ex. 4 an 5) result in a polymerization product having a molecular weight distribution that looks like the combination of the two individual catalysts, confirming that both catalysts are active in the polymerization reactor.

As described above, embodiments disclosed herein provide a mixed catalyst system including a chromium catalyst and a Ziegler-Natta catalyst. Such mixed catalyst systems may be used in an olefin polymerization reactor without detriment and may be used to produce improved polymer products. The Ziegler-Natta catalysts in catalyst systems disclosed herein run exceptionally well without addition of excessive amounts of co-catalyst, thus allowing for use of chromium based supported catalysts that would otherwise be overwhelmed by aluminum alkyl. Further, embodiments disclosed herein may be run without an internal electron donor, and the lack of an internal electron donor in the system also prevents poisoning of the chromium catalysts by the internal electron donor. By including or co-feeding a chromium based catalyst with these Ziegler-Natta catalysts, it has been found that the molecular architecture of the resulting polyolefins, such as polyethylenes, may provide for resins with excellent processing properties. Additionally, the molecular weight distribution of polymers produced using mixed catalysts described herein may be tailored, for both single and dual reactor resins, without added unit operations, such as oxygen tailoring, azide coupling, and the like.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

Only certain ranges are explicitly disclosed herein. Any numerical range recited herein, includes all values from the lower value and the upper value, in increments of one unit, provided that there is a separation of at least two units between any lower value and any higher value. Ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

For purposes of certain jurisdictions, the following embodiments are provided:

1. A catalyst system for polymerizing olefin-based polymers and interpolymers, the catalyst system comprising: a Ziegler-Natta catalyst comprising a bulking agent, Mg, and Ti; and a supported chromium catalyst.
2. The catalyst system of embodiment 1, wherein the Ziegler-Natta catalyst further comprises at least one of Hf and Zr.
3. The catalyst system of embodiment 1 or embodiment 2, wherein the bulking agent comprises silica.
4. The catalyst system of any one of embodiments 1-3, wherein a weight ratio of the supported chromium catalyst to the Ziegler-Natta catalyst is in the range from about 1:99 to 99:1.
5. The catalyst system of any one of embodiments 1-4, further comprising a co-catalyst comprising an aluminum alkyl, wherein a molar ratio of aluminum to titanium is less than 35:1.
6. The catalyst system of embodiment 5, wherein a molar ratio of aluminum alkyl to Cr is less than about 300:1.
7. The catalyst system of any one of embodiments 1-6, wherein the catalyst system does not include an internal electron donor.
8. The catalyst system of any one of embodiments 1-7, as appropriate, wherein the Mg, Ti, Hf, and Zr metals, when used, are halogenated.
9. The catalyst system of any one of embodiments 1-8, as appropriate, wherein the Ziegler-Natta catalyst is produced by spray drying a solution comprising one or more of Si, Mg, Ti, Hf, and Zr in an alcohol solvent, and subsequently halogenating the Mg, Ti, Hf, and Zr.
10. The catalyst system of any one of embodiments 1-9, as appropriate, wherein the Ziegler-Natta catalyst is produced by a process comprising:
   a. combining one or more supports with one or more Mg-containing compounds under reactions conditions to form a first reacted product;
   b. combining the first reacted product with one or more chlorinating compounds selected from the group consisting of aluminum alkyl chlorides, halo-substituted silanes, organic chlorides, and combinations thereof, to form a second reacted product; and
   c. combining the second reacted product with one or more titanium-containing compounds selected from the group consisting of titanium alkoxides, titanium halides, titanium amides, and combinations thereof under reaction conditions to form the catalyst.
11. The catalyst system of any one of embodiments 1-10, wherein the supported chromium catalyst comprises at least one of a supported reduced silyl chromate catalyst and a supported reduced chromium oxide catalyst.
12. A process for producing olefin-based polymers, the process comprising: polymerizing at least one olefin monomer in a reactor in the presence of a mixed catalyst system to produce an olefin-based polymer, the mixed catalyst system comprising: a Ziegler-Natta catalyst comprising a bulking agent, Mg, and Ti; and a supported chromium catalyst.
13. The process of embodiment 12, further comprising independently feeding the Ziegler-Natta catalyst and the supported chromium catalyst to the reactor.
14. The process of embodiment 12, further comprising co-feeding the Ziegler-Natta catalyst and the supported chromium catalyst to the reactor.
15. The process of any one of embodiments 12-14, wherein the olefin-based polymer comprises at least one of an ethylene-based polymer and an ethylene/alpha-olefin interpolymer.
16. The process of any one of embodiments 12-15, wherein the Ziegler-Natta catalyst further comprises at least one of Hf and Zr.
17. The process of any one of embodiments 12-16, wherein the bulking agent comprises silica.
18. The process of any one of embodiments 12-17, wherein a weight ratio of the supported chromium catalyst to the Ziegler-Natta catalyst is in the range from about 1:99 to 99:1.
19. The process of any one of embodiments 12-18, further comprising feeding a co-catalyst comprising an aluminum alkyl to the reactor, wherein a molar ratio of aluminum to titanium in the reactor is less than 35:1.
20. The process of embodiment 19, wherein a molar ratio of aluminum alkyl to Cr in the reactor is less than about 300:1.
21. The process of any one of embodiments 12-20, wherein the catalyst system does not include an internal electron donor.
22. The process of any one of embodiments 12-21, as appropriate, wherein the Mg, Ti, Hf, and Zr metals, when used, are each present as a halogen.
23. The catalyst system of any one of embodiments 12-22, as appropriate, wherein the Ziegler-Natta catalyst is produced by a process comprising:
   a. combining one or more supports with one or more Mg-containing compounds under reactions conditions to form a first reacted product;
   b. combining the first reacted product with one or more chlorinating compounds selected from the group consisting of aluminum alkyl chlorides, halo-substituted silanes, organic chlorides, and combinations thereof, to form a second reacted product; and
   c. combining the second reacted product with one or more titanium-containing compounds selected from the group consisting of titanium alkoxides, titanium halides, titanium amides, and combinations thereof under reaction conditions to form the catalyst.
24. The process of any one of embodiments 12-23, as appropriate, wherein the Ziegler-Natta catalyst is produced by spray drying a solution comprising Si, Mg, Ti, Hf, and Zr in an alcohol solvent, and subsequently halogenating the Mg, Ti, Hf, and Zr.
25. The process of any one of embodiments 12-23, comprises at least one of a supported reduced silyl chromate catalyst and a supported reduced chromium oxide catalyst.
26. The process of any one of embodiments 12-24, wherein the reactor comprises a gas phase polymerization reactor.
27. An olefin polymer or interpolymer produced by the process of any one of embodiments 12-26.
28. The olefin polymer or interpolymer of embodiment 27, comprising at least 5 wt. % polymer produced by the chromium catalyst.
29. The olefin polymer or interpolymer of embodiment 27 or embodiment 28, wherein the olefin polymer or interpolymer is an ethylene-based polymer or interpolymer.
30. The olefin polymer or interpolymer of embodiment 27 or embodiment 28, wherein the olefin polymer or interpolymer is a propylene-based polymer or interpolymer.

What is claimed:

1. A catalyst system for producing olefin-based polymers and interpolymers, the catalyst system comprising:
   a Ziegler-Natta catalyst comprising Mg, and Ti produced by a process comprising:
   combining one or more supports with one or more Mg-containing compounds to form a first reacted product;
   combining the first reacted product with one or more chlorinating compounds selected from the group consisting of aluminum alkyl chlorides, halo-substituted silanes, organic chlorides, and combinations thereof, to form a second reacted product; and
   combining the second reacted product with one or more titanium-containing compounds selected from the group consisting of titanium alkoxides, titanium halides, titanium amides, and combinations thereof, to form the Ziegler-Natta catalyst; and
   a supported chromium catalyst,
   wherein the supported chromium catalyst comprises at least one of a) a supported reduced silyl chromate catalyst and b) a supported reduced chromium oxide catalyst which has been reduced by DEALE.

2. The catalyst system of claim 1, wherein a weight ratio of the supported chromium catalyst to the Ziegler-Natta catalyst is in the range from about 1:99 to 99:1.

3. The catalyst system of claim 1, further comprising a co-catalyst comprising an aluminum alkyl, wherein a molar ratio of aluminum to titanium is less than 35:1.

4. The catalyst system of claim 3, wherein a molar ratio of aluminum alkyl to Cr is less than about 300:1.

5. The catalyst system of claim 1, wherein the catalyst system does not include an internal electron donor.

6. A process for producing olefin-based polymers, the process comprising:
   polymerizing at least one olefin monomer in a reactor in the presence of a mixed catalyst system to produce an olefin-based polymer, the mixed catalyst system comprising:
   a Ziegler-Natta catalyst comprising a bulking agent, Mg, and Ti; and
   a supported chromium catalyst,
   wherein the supported chromium catalyst comprises at least one of a) a supported reduced silyl chromate catalyst and b) a supported reduced chromium oxide catalyst which has been reduced by DEALE; and
   wherein the Ziegler-Natta catalyst is produced by a process comprising:
   a. combining one or more supports with one or more Mg-containing compounds under reaction conditions to form a first reacted product;
   b. combining the first reacted product with one or more chlorinating compounds selected from the group consisting of aluminum alkyl chlorides, halo-substituted silanes, organic chlorides, and combinations thereof, to form a second reacted product; and
   c. combining the second reacted product with one or more titanium-containing compounds selected from the group consisting of titanium alkoxides, titanium halides, titanium amides, and combinations thereof, under reaction conditions to form the catalyst.

7. The process of claim 6, further comprising independently feeding the Ziegler-Natta catalyst and the supported chromium catalyst to the reactor.

8. The process of claim 6, further comprising co-feeding the Ziegler-Natta catalyst and the supported chromium catalyst to the reactor.

9. The process of claim 6, wherein the Ziegler-Natta catalyst further comprises at least one of Hf and Zr.

10. The process of claim 6 wherein the bulking agent comprises silica.

11. The process of claim 7, wherein a weight ratio of the supported chromium catalyst to the Ziegler-Natta catalyst is in the range from about 1:99 to 99:1.

12. The process of claim 6, further comprising feeding a co-catalyst comprising an aluminum alkyl to the reactor, wherein a molar ratio of aluminum to titanium in the reactor is less than 35:1.

13. The process of claim 12, wherein a molar ratio of aluminum alkyl to Cr in the reactor is less than about 300:1.

14. The process of claim 6, wherein the catalyst system does not include an internal electron donor.

15. The process of claim 6, wherein the Mg, Ti, Hf, and Zr metals, when used, are each present as a halogen.

* * * * *